United States Patent
Greene (10) Patent No.: US 8,482,767 B2
(45) Date of Patent: Jul. 9, 2013

(54) PRINT JOB SUBMISSION WITH SLEEP MECHANISM

(75) Inventor: Edwin L. Greene, Loveland, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 831 days.

(21) Appl. No.: 12/369,116

(22) Filed: Feb. 11, 2009

(65) Prior Publication Data

US 2010/0202009 A1     Aug. 12, 2010

(51) Int. Cl.
    *G06F 3/12*     (2006.01)
    *G06K 15/00*     (2006.01)

(52) U.S. Cl.
    USPC ......................... 358/1.15; 358/1.14

(58) Field of Classification Search
    USPC ............................... 358/1.15, 1.16
See application file for complete search history.

(56) References Cited

U.S. PATENT DOCUMENTS

| | | | |
|---|---|---|---|
| 7,072,066 B2 | 7/2006 | Guddanti | |
| 7,298,508 B2 * | 11/2007 | Furukawa et al. | 358/1.14 |
| 2004/0223176 A1 | 11/2004 | Ueda | |
| 2005/0190383 A1 * | 9/2005 | Levin et al. | 358/1.1 |
| 2006/0150193 A1 * | 7/2006 | Sharpe et al. | 718/107 |
| 2006/0193006 A1 | 8/2006 | Lawrence et al. | |
| 2008/0144084 A1 | 6/2008 | Rai | |
| 2008/0225326 A1 | 9/2008 | Kephart | |
| 2008/0239367 A1 | 10/2008 | Podl | |
| 2008/0239368 A1 * | 10/2008 | Ota | 358/1.15 |

OTHER PUBLICATIONS

Drakopoulos, Elias, "Design Issues in Client/ Server Systems", 0-7803-2492-7/95 IEEE, (1995), 487-493.

* cited by examiner

*Primary Examiner* — Twyler Haskins
*Assistant Examiner* — Fred Guillermety
(74) *Attorney, Agent, or Firm* — Blakely, Sokoloff, Taylor & Zafman LLP (57) ABSTRACT

A method disclosed. The method includes a print application determining if capacity is available at a print server to receive print jobs in a print job queue, transmitting the print jobs if there is no capacity available at the print server; and entering a sleep mode for a predetermined sleep interval if there is no capacity available at the print server.

18 Claims, 7 Drawing Sheets

PRINT JOB SUBMISSION WITH SLEEP MECHANISM

FIELD OF THE INVENTION

The invention relates to the field of computer systems, and in particular, to upgrading printing software products.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. However, the printing software may often suffer from decreased productivity as a result of users overloading the system with too many print jobs.

A solution to this overloading problem is to train customers as to how to properly use the system in order to increase the number of knowledgeable system operators. However, some customers may choose not to expend the time and resources necessary to train their personnel. Further, personnel turnover may make retraining necessary.

Accordingly, a mechanism to automatically submit print jobs is desired.

SUMMARY

In one embodiment, a method includes a print application determining if capacity is available at a print server to receive print jobs in a print job queue, transmitting the print jobs if there is no capacity available at the print server; and entering a sleep mode for a predetermined sleep interval if there is no capacity available at the print server.

Another embodiment discloses a print application having a print queue to store a plurality of print jobs to be transmitted for printing a graphical user interface to enter the print jobs and a print application. The print application determines if capacity is available at a print server to receive print jobs in the print job queue, transmits the print jobs if there is no capacity available at the print server and enters a sleep mode for a predetermined sleep interval if there is no capacity available at the print server.

A further embodiment discloses an article of manufacture comprising a machine-readable medium including data that, when accessed by a machine, cause the machine to perform operations comprising determining if capacity is available at a print server to receive print jobs in a print job queue, transmitting the print jobs if there is no capacity available at the print server; and entering a sleep mode for a predetermined sleep interval if there is no capacity available at the print server.

BRIEF DESCRIPTION OF THE DRAWINGS

A better understanding of the present invention can be obtained from the following detailed description in conjunction with the following drawings, in which.

DETAILED DESCRIPTION

A print job submission mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
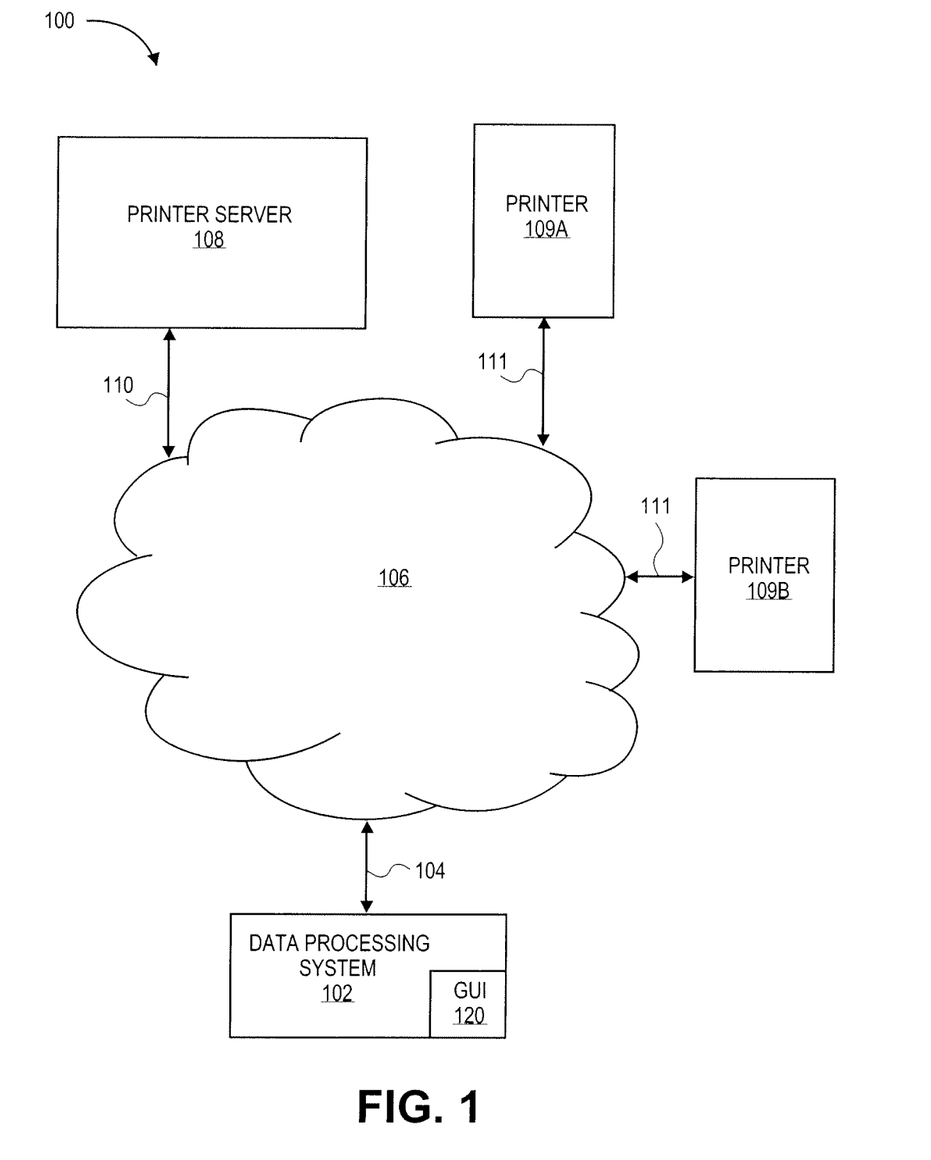
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select the desired print server 108 and submit requests for service requests to printer 109 via print server 108 over network 106. In a further embodiment, print server 108 includes a print queue for print jobs requested by remote data processing systems.

Although described as separate entities, other embodiments may include print server 108 being incorporated in one or more of the printers 109. However in other embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 between data processing system 102 and one or more of printers 109. In other embodiments, the printing software manages printing of documents from multiple data processing systems 102 to the one or more printers 109.

According to one embodiment, the printing software product may be implemented using either InfoPrint Manager (IPM) or Infoprint ProcessDirector (IPPD), although other types of printing software may be used instead. In a further embodiment, data processing system 102 includes a print application that interacts with the printing software at printer server 108 to provide for efficient transmission of print jobs.

Figure 2A:
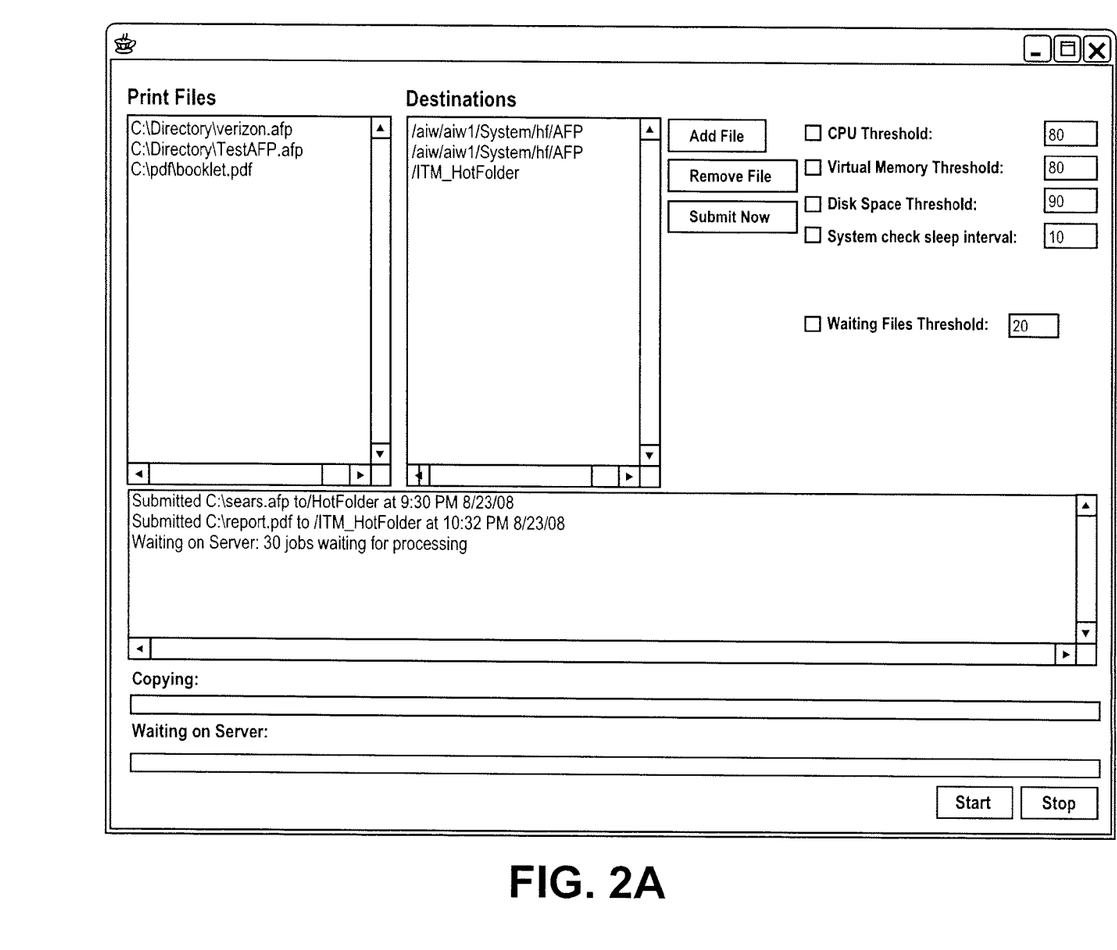
FIG. 2 illustrate screen shots of embodiments of a graphical user interface.

In one embodiment, the print application includes a graphical user interface (GUI) 120 that enables a system administrator (or operator) to interact with the print application. FIGS. 2A and 2B are screen shots of embodiments of GUI 120. According to one embodiment, an operator at data processing system 102 implements GUI 120 to automatically submit print jobs to the printing software product at printer server 108.

In such an embodiment, the operator uses GUI 120 to add print jobs to a print queue. As shown in FIG. 2A, GUI 120 includes a Print Files entry, which includes files selected to be printed, along with a Destination entry indicating which target each respective file is to be printed. The Destination entry may be an entry point from which print server 108 accepts the print job. Once a print job is placed at this Destination, it is assumed that the print server has accepted that work and that the workload of print server 108 has increased by the amount associated with that print job.

In one embodiment, the print application determines when the print jobs are to be submitted to printer server 108 based on certain criteria. Such criteria may include the number of print jobs being processed already, processor utilization, virtual memory resources, etc.).

According to one embodiment, the print application analyzes the print jobs in the queue to automatically prioritize them based on a current system state whenever not submitting print jobs. Alternatively, the print application may enter a sleep mode whenever not submitting print jobs.

Figure 3:
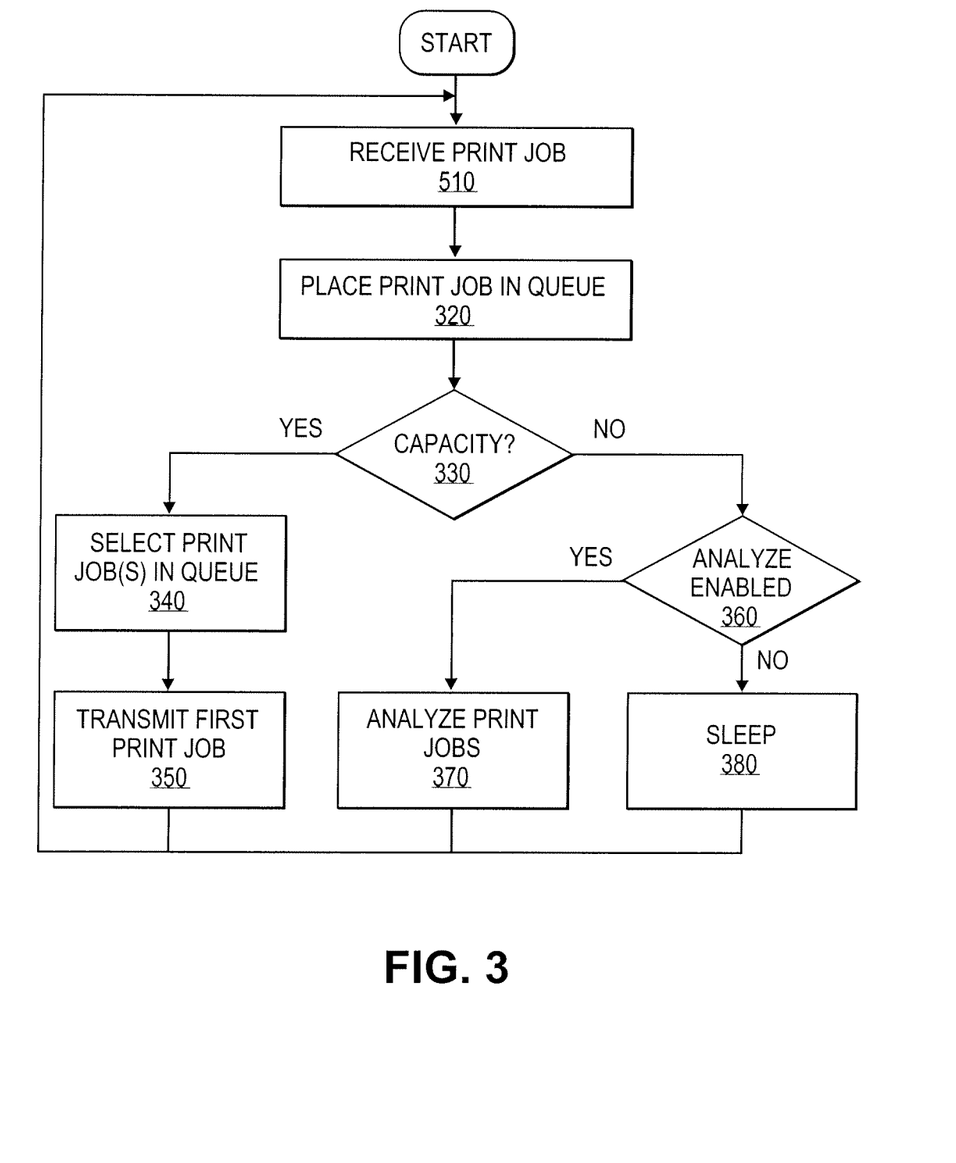
FIG. 3 is a flow diagram illustrating one embodiment of submitting a print job.

FIG. 3 is a flow diagram illustrating one embodiment of the operation of the print application submitting a print job. At processing block 310, a print job added by the operator via GUI 120 is received at the print application. At processing block 320, the print job is added to a queue. At decision block 330, it is determined whether capacity (e.g., disk space) is available at print server 108 for one or more of the print jobs in the queue. In one embodiment, the print application queries the printing software to determine the capacity.

If the printing software has capacity, one or more print jobs in the queue are selected for transmission to print server 108, processing block 340. In one embodiment, the print jobs may be selected based upon a first in first out (FIFO), last in first out (LIFO) prioritization scheme. However other priority schemes (e.g., file size) may be implemented. At processing block 350, the selected print job is transmitted to print server 108. Subsequently, an entry is written into a log to track the print job.

If it is determined that the printing software does not currently have the capacity to receive a print job, it is determined whether print application has an Analyze Print Jobs feature activated, decision block 360. If the Analyze Print Jobs feature is activated the Analyze Print Jobs function is performed, processing block 370.

The Analyze Print Jobs function analyzes characteristics for the print jobs in the queue for automatic job prioritization. For instance, the function may determine which print jobs will require light processing and which jobs will require heavy processing, and assigns priority based on current workload level.

According to one embodiment, the operator sets a value (WorkThreshold) that establishes a level of workload for the print application, while a (Work) value represent a number of print jobs being processed in a prepare phase or a number of jobs queued for a processing task. PotentialWork is measured by the difference between the WorkThreshold value and the Work value.

In a further embodiment, an AutoThresholding mechanism is implemented to enable print server 108 to communicate the number of jobs it was able to print over a certain time interval (as set by the operator) and to change the threshold of the print application accordingly. Thus, the threshold is increased if print server 108 is able to handle more work, or decreased if print server 108 was unable to print the number of jobs specified by the original threshold.

Figure 4:
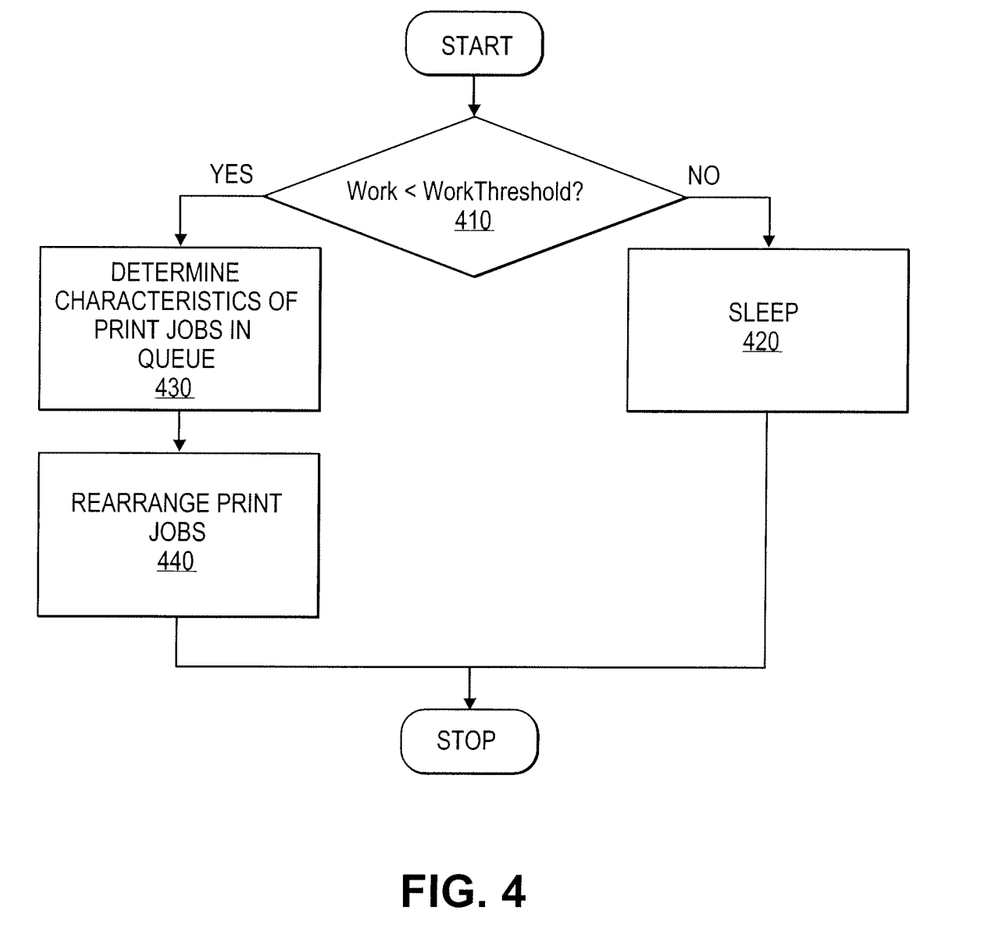
FIG. 4 is a flow diagram illustrating another embodiment of submitting a print job.

FIG. 4 is a flow diagram illustrating one embodiment of the operation of the Analyze Print Jobs function. At decision block 410, it is determined whether the print application has potential to accept additional work (e.g., Work<WorkThreshold). If there is no potential to accept additional work, the print application enters the sleep mode, processing block 420. In one embodiment, the sleep length depends on the printing software capacity and PotentialWork, whichever yields the shorter sleep duration.

If there is potential to accept additional work, the print application determine characteristics of the print jobs in the queue by estimating the workload for a job, processing block 430. In one embodiment, simple print job types are determined to have low workloads, while complex print jobs (e.g., those performing transform/Sort-Split/Index) are determined to have potentially high workloads). At processing block 440, the print jobs in the queue are rearranged based on the print jobs that best match the current availability for the next submission.

In a further embodiment, the characteristics of the print job used for prioritization are based on user designed criterion. For example, the operator may add a print job to the print queue via GUI 120, select the print job and then modify its characteristics, providing additional characteristics that are unavailable to the print application. For example, characteristics that are available to the application are the size of the job (as in, the disk size in bytes), but the characteristic of the print job that indicates that it needs to be separated into documents and indexed (functions of InfoPrint Solutions DocPool software and Advanced Function Printing (AFP) Indexer software) is not something that the print application will have an inherent knowledge of. In this instance, the operator modifies the characteristics of the job and adds to its workload "weight", indicating that it will require a greater amount of work then the application would suspect based on file size alone.

Referring back to FIG. 3, if the Analyze Print Jobs feature is deactivated, the print application enters the sleep mode, processing block 370. In one embodiment, a sleep interval for the sleep mode is determined by the previously queried printing software capacity, where the number of jobs waiting to be processed at print server 108 is received. In such an embodiment, the sleep interval is automatically adjusted. In a further embodiment, the previous sleep interval is saved and a new interval is adjusted based on the number of jobs waiting to be processed. Thus, the sleep interval increases as the number of jobs in a waiting state increases, and decreases as the number of waiting jobs decreases.

Figure 5:
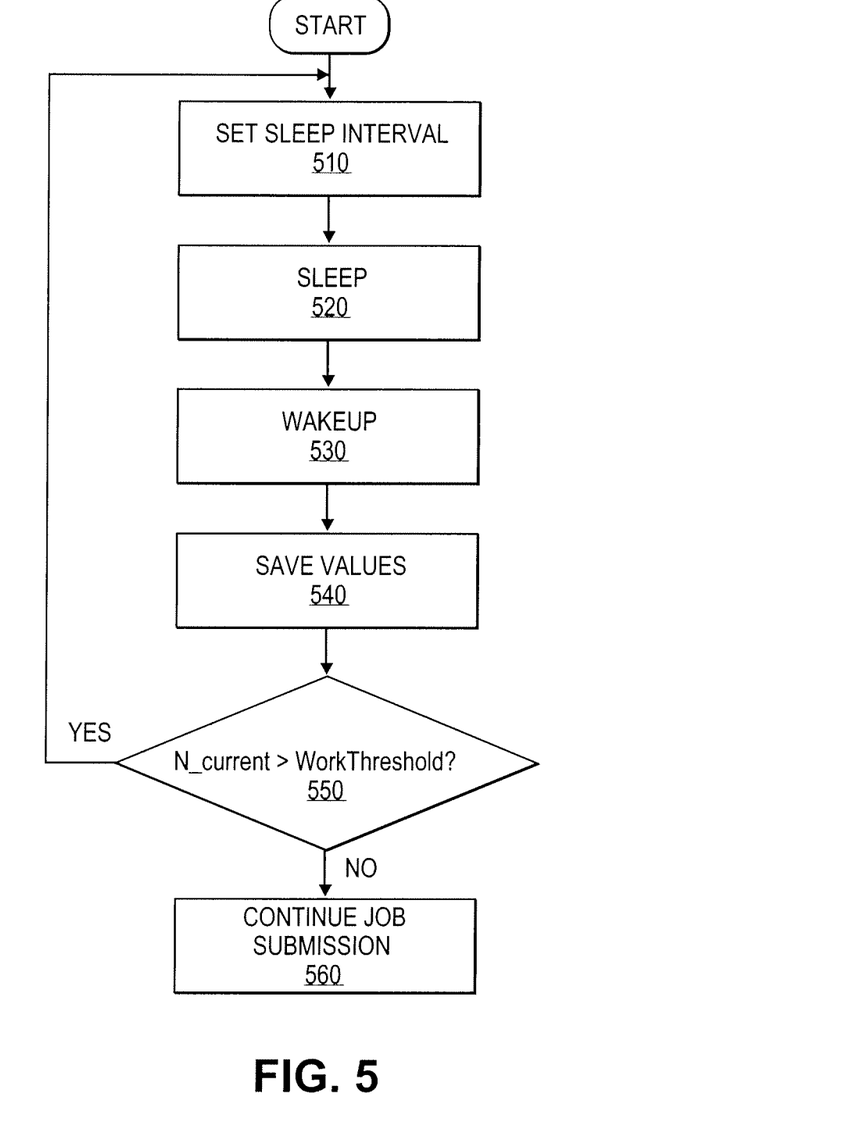
FIG. 5 is a flow diagram illustrating one embodiment of a smart sleep mechanism.

FIG. 5 is a flow diagram illustrating one embodiment of a smart sleep mechanism. At processing block 510, a current sleep interval (CurrentSleep) is set. In one embodiment, CurrentSleep is calculated by dividing the number of jobs above the user specified threshold that are presently waiting to be processed (N_current) by the number of jobs previously (e.g., as of the last sleep interval) above the user threshold waiting to be processed (N_previous) and multiplying the result by a default user specified value (or one second if no default specified) (PreviousSleep).

At processing block 520, the print application enters the sleep mode upon determining that the printing software does not currently have the capacity to receive additional print jobs. At processing block 530, the print application awakens from the sleep mode. At processing block 540, new values are saved in order to update CurrentSleep. According to one embodiment, N_previous is saved as N_current, PreviousSleep is saved as CurrentSleep, and N_current is saved as the number of jobs waiting to be processed as determined by a subsequent query of printing software capacity.

Figure 6:
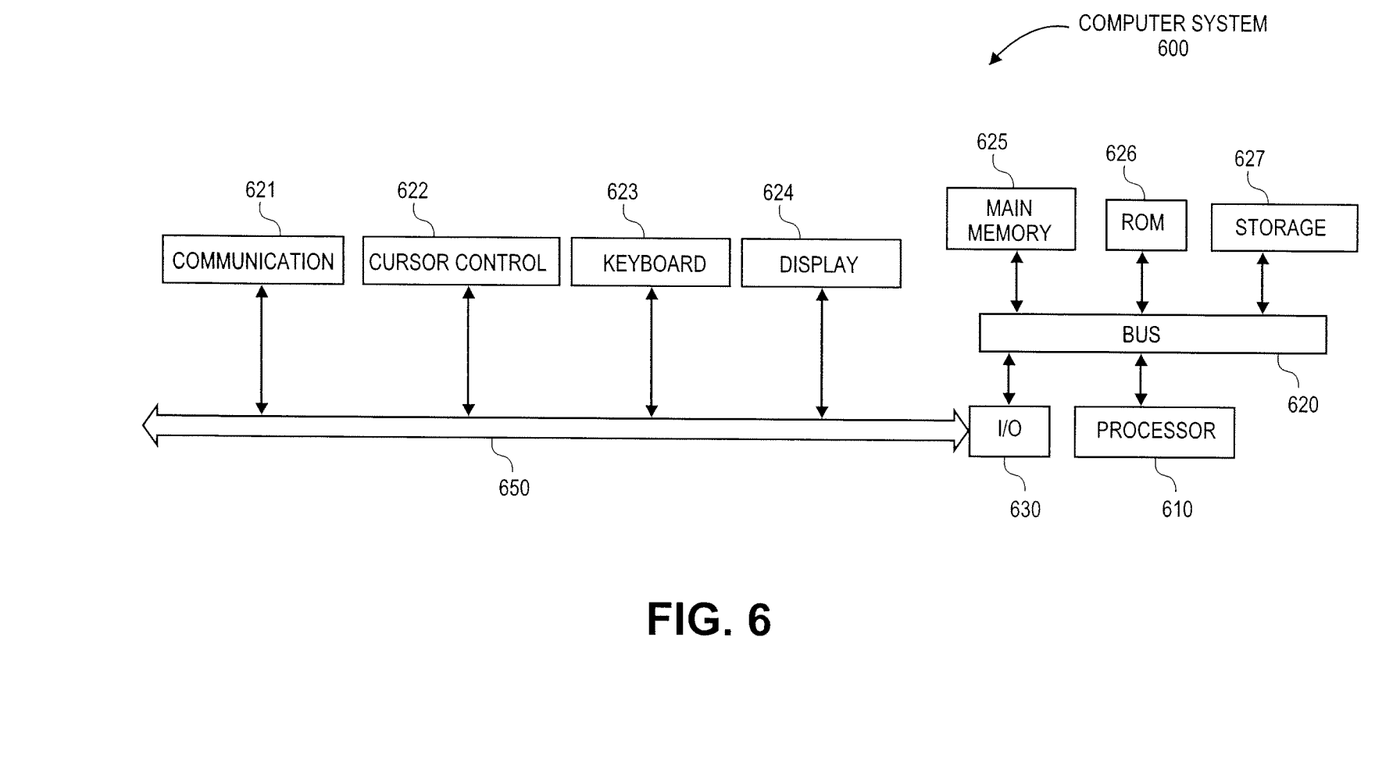
FIG. 6 illustrates one embodiment of a computer system.

At decision block 550, it is determined whether N_current is greater than the previously set threshold value (e.g., WorkThreshold). If N_current>the threshold, control is returned to processing block 510 where a new CurrentSleep is calculated prior to re-entering the sleep mode. Otherwise, the print application continues to submit print jobs to the printing software, processing block 560, FIG. 6 illustrates a computer system 600 on which data processing system 102 and/or server 108 may be implemented. Computer system 600 includes a system bus 620 for communicating information, and a processor 610 coupled to bus 620 for processing information.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients). The communication device 621 may comprise a modem, a network interface card, or other well-known interface device, such as those used for coupling to Ethernet, token ring, or other types of networks.

The above-described mechanism keeps productivity hindering jobs from a server until the server has the capacity to process the jobs.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A print client, comprising:
   memory device to store:
      a print queue having a plurality of print jobs to be transmitted for printing;
      a graphical user interface;
      a print application; and
   a processor to execute the print application to determine if capacity is available at a print server to receive print jobs in the print job queue determine if a number of print jobs above a user specified threshold is greater than a predetermined threshold if there is no capacity available at the print server and calculates a sleep interval if the number of print jobs above the user specified threshold is greater than the predetermined threshold.

2. The print client of claim 1 wherein the print application enters a sleep mode according to the sleep interval.

3. The print client of claim 2 wherein the print application awakens from the sleep mode, transmits print jobs to the print server upon awakening from the sleep mode and saves new values to recalculate the sleep interval.

4. The print client of claim 1 wherein the print application transmits the print jobs if there is capacity available at the print server.

5. The print client of claim 1 wherein the print application transmits print jobs to the print server if the number of print jobs above the user specified threshold is greater than the predetermined threshold.

6. An article of manufacture comprising a non-transitory machine-readable medium including data that, when accessed by a machine, cause the machine to perform operations comprising:

determining if capacity is available at a print server to receive print jobs in a print job queue;

determining if a number of print jobs above a user specified threshold is greater than a predetermined threshold if there is no capacity available at the print server; and calculating a sleep interval if the number of print jobs above the user specified threshold is greater than the predetermined threshold.

7. The article of manufacture of claim 6 wherein the sleep interval is automatically adjusted based on a number of print jobs waiting to be processed at a print server.

8. The article of manufacture of claim 7 wherein the sleep interval is increased if the number of print jobs waiting to be processed at a print server is increased and decreased if the number of print jobs waiting to be processed at a print server is decreased.

9. The article of manufacture of claim 6 wherein the machine-readable medium includes data that causes the machine to perform further operations comprising entering a sleep mode according to the sleep interval.

10. The article of manufacture of claim 9 wherein the machine-readable medium includes data that causes the machine to perform further operations comprising:

awakening from the sleep mode;

transmitting print jobs to the print server upon awakening from the sleep mode; and saving new values to recalculate the sleep interval.

11. The article of manufacture of claim 6 wherein the sleep interval is calculated by dividing a number of print jobs above a predetermined threshold that are waiting to be processed at a print server by a number of print jobs previously above the predetermined threshold waiting to be processed and multiplying the result by a default value.

12. The article of manufacture of claim 6 wherein the machine-readable medium includes data that causes the machine to perform further operations comprising transmitting the print jobs if there is capacity available at the print server.

13. The article of manufacture of claim 6 wherein the machine-readable medium includes data that causes the machine to perform further operations comprising further comprising transmitting print jobs to the print server if the number of print jobs above the user specified threshold is greater than the predetermined threshold.

14. A system comprising:

a print server; and a print client, communicatively coupled to the print server, having:

a print queue to store a plurality of print jobs to be transmitted for printing;

a graphical user interface to enter the print jobs; and a print application to determine if capacity is available at a print server to receive print jobs in the print job queue determine if a number of print jobs above a user specified threshold is greater than a predetermined threshold if there is no capacity available at the print server and calculates a sleep interval if the number of print jobs above the user specified threshold is greater than the predetermined threshold.

15. The print client of claim 14 wherein the print application enters a sleep mode according to the sleep interval.

16. The print client of claim 15 wherein the print application awakens from the sleep mode, transmits print jobs to the print server upon awakening from the sleep mode and saves new values to recalculate the sleep interval.

17. The print client of claim 14 wherein the print application transmits the print jobs if there is capacity available at the print server.

18. The print client of claim 14 wherein the print application transmits print jobs to the print server if the number of print jobs above the user specified threshold is greater than the predetermined threshold.

* * * * *